US006548579B2

(12) United States Patent
Reski et al.

(10) Patent No.: US 6,548,579 B2
(45) Date of Patent: Apr. 15, 2003

(54) ADHESIVE COMPOSITION COMPRISING A PARTICULATE THERMOPLASTIC COMPONENT

(75) Inventors: Merilee M. Reski, Woodbury, MN (US); Kiem H. Dang, Minneapolis, MN (US); Robert M. Hume, III, Woodbury, MN (US); David B. Malcolm, Maplewood, MN (US); Kathryn A. Coleman, Minneapolis, MN (US); Ronald R. Davies, St. Paul, MN (US)

(73) Assignee: H. B. Fuller Licensing & Financing, Inc., St. Paul, MN (US)

( * ) Notice: Subject to any disclaimer, the term of this patent is extended or adjusted under 35 U.S.C. 154(b) by 72 days.

(21) Appl. No.: 09/795,756

(22) Filed: Feb. 28, 2001

(65) Prior Publication Data
US 2002/0010256 A1 Jan. 24, 2002

Related U.S. Application Data
(60) Provisional application No. 60/193,295, filed on Mar. 30, 2000.

(51) Int. Cl.$^7$ ................................................. C08L 89/00
(52) U.S. Cl. ........................ 524/47; 524/513; 524/514; 524/523; 524/524; 524/525; 524/528
(58) Field of Search .......................... 524/47, 513, 514, 524/523, 524, 525, 528

(56) References Cited

U.S. PATENT DOCUMENTS

| 4,536,012 A | | 8/1985 | Hume, III |
| 4,702,496 A | | 10/1987 | Hume, III |
| 4,960,295 A | | 10/1990 | Bodouroglou |
| 5,264,467 A | * | 11/1993 | DiStefano .................... 523/218 |
| 5,443,674 A | | 8/1995 | Fresonke et al. |

FOREIGN PATENT DOCUMENTS

| EP | 0383592 | 8/1990 |
| EP | 0896029 | 2/1999 |
| JP | 63238179 | 10/1988 |
| WO | 94/05738 | 3/1994 |

* cited by examiner

Primary Examiner—Bernard Lipman
(74) Attorney, Agent, or Firm—Su Bin

(57) ABSTRACT

The invention is directed to an adhesive composition comprising a water based component including a film-forming polymer and a particulate thermoplastic component selected from the group consisting of thermoplastic polymers, thermoplastic resins, hot melt adhesive compositions, and mixtures thereof. The thermoplastic component has a mean particle size of from about 10 microns to about 1,500 microns. The adhesive composition is useful as a one-shot bookbinding adhesive, a primer composition as well as a second-shot adhesive for two-shot bookbinding method. The invention is also directed to the bookbinding methods using the adhesive composition.

28 Claims, No Drawings

ADHESIVE COMPOSITION COMPRISING A PARTICULATE THERMOPLASTIC COMPONENT

This application claims the benefit of Provisional application Ser. No. 60/193,295, filed Mar. 30, 2000.

BACKGROUND OF APPLICATION

The invention relates to an adhesive composition comprising a water based component containing a film-forming polymer and a particulate thermoplastic component. The adhesive composition is useful either as a one-shot bookbinding adhesive or as a primer composition in a two-shot bookbinding method.

Description of Related Art

In the manufacture of book blocks, either a "one-shot" method or a "two-shot" method is employed. In the one-shot method, a hot melt adhesive composition (i.e., a one-shot adhesive) is applied directly onto the spine of the book block. In the two-shot method, however, a primer composition is first applied onto the spine as the "first shot". Then, an adhesive composition (i.e., a second-shot adhesive) is applied to the surface of the dried primer as the "second shot". Either water based compositions or hot melt compositions can be used as primer compositions and/or the second-shot adhesive compositions with typically water based compositions being used as primer compositions and hot melt compositions as second-shot adhesive compositions.

Water based primer compositions exhibit better penetration into the signatures (grouping of sheets of paper) due to their longer open times and low viscosities. They are also less susceptible to fluctuations in temperature once the book is constructed. However, water based primers also set more slowly because of the time needed to evaporate the water contained therein. Hence, the maximum bookbinding manufacturing speed is limited by the time needed to dry and set the water based primers. Dryers and heat are often utilized to facilitate drying of the water based primers in order to maintain reasonable production rates. When exposed to intense heat, however, the water based primer coating tends to skin over and trap moisture within the formed polymeric membrane. The trapped water in the interior of the water based primer layer vaporizes causing the membrane to lift and form large blisters that break and burn under heat. On the other hand, the water based primer coating that is not sufficiently dried also causes splattering and blistering upon application of a second-shot hot melt adhesive at application temperatures ranging from about 100° C. to about 200° C. due to remaining water present in the water based primer. The blistered layer of the water based primer is not bonded to the book block, and thus results in voids along the book spine and within the set adhesive layers. Partially bound books are not only defective products that can't be sold, but also may cause jams and delays in the bookbinding process itself.

U.S. Pat. No, 4,536,012 discloses a two-shot continuous bookbinding process using a water based primer composition and a hot melt adhesive. The water based primer composition comprises a polymeric latex and ungelatinized starch having a granule size of about 2–150 microns. The granule starch complexes a major portion of the water contained in the primer composition during the drying stage, thereby resisting blistering and charring when exposed to high drying temperatures.

U.S. Pat. No. 4,702,496 further discusses the use of ungelatinized starch in water based primer compositions which are utilized with a hot-covering adhesive in order to eliminate the need for the drying step.

U.S. Pat. No. 4,960,295 discloses two-shot hot melt bookbinding adhesives including a first-shot hot melt adhesive as the primer and a second-shot hot melt adhesive as the cover glue. The primer is based on ethylene-vinyl acetate (EVA) polymers having a low viscosity. The second-shot adhesive is based on EVA polymers having a higher viscosity.

SUMMARY OF THE INVENTION

In one aspect, the invention features an adhesive composition comprising a water based component containing a film-forming polymer and a thermoplastic component selected from the group consisting of thermoplastic polymers, thermoplastic resins, hot melt adhesive compositions, and mixtures thereof. The thermoplastic component is in particulate form having a mean particle size of from about 10 microns to about 1,500 microns.

In another aspect, the invention features a method of making the aforesaid adhesive composition comprising grinding a thermoplastic component to the desired particle size and mixing the particles of the thermoplastic component with a water based component and optional additives.

In yet another aspect, the invention features a method of binding a book block having a spine area to form a book comprising applying the aforesaid adhesive composition to a book block spine, drying the adhesive composition, and applying a second-shot hot melt bookbinding adhesive to the surface of the dried adhesive composition.

In yet another aspect, the invention features a method of binding a book block having a spine area to form a book comprising applying the aforesaid adhesive composition to a book block spine, heating the adhesive composition such that the water based component forms a dried film and that the thermoplastic component melts, and adhering a book cover or a capping paper with the book block by means of the thermoplastic component.

The invention is an improvement over traditional water based bookbinding primer compositions by the addition of a particulate thermoplastic component. The particulate thermoplastic component advantageously improves the interfacial adhesion between the water based primer and the second-shot hot melt adhesive, particularly when employing a particulate hot melt adhesive composition as the thermoplastic component. The thermoplastic component also inhibits or delays the formation of a polymeric membrane barrier upon rapid loss of water, thereby eliminating the formation of large blisters. Further, the adhesive composition can be formulated to have a substantially increased solids content while maintaining a sufficiently low viscosity. The increased solids content increases the rate of set of the adhesive composition as a primer, thereby speeding up the production rate.

The adhesive composition of the invention finds particular utility for use as a primer composition that is applied to a substrate, such as the spine of a book block, and dried, and then, a second-shot hot melt adhesive is applied to the surface of the dried primer. In this instance, the adhesive composition of the invention can be formulated to exhibit 180° peel strength increase of at least 20%, and preferably, at least 30%. That is, the interfacial adhesion between the adhesive composition of the invention as the primer and the sequentially applied second-shot hot melt adhesive is improved by at least 20%, preferably at least 30% in comparison to the interfacial adhesion between the same primer composition lacking the particulate thermoplastic component and the second-shot hot melt adhesive.

The adhesive composition can also be formulated as a second-shot adhesive used in the two-shot bookbinding method in combination with any primer compositions including the adhesive composition of the invention formulated as a primer composition.

The adhesive composition also finds particular utility for use as a one-shot bookbinding adhesive that is applied to a substrate such as the spine of a book block, and then heated such that the particulate thermoplastic component becomes molten. In this instance, the adhesive composition of the invention exhibits the combined advantages of better penetration into the signatures (grouping of sheets of paper) contributed by the water based component as well as improved rate of set of the adhesive and specific adhesion contributed by the particulate thermoplastic component.

DETAILED DESCRIPTION OF THE INVENTION

The adhesive composition of the invention comprises a water based component comprising a film-forming polymer, and a particulate thermoplastic component.

In the context of the invention, "water based component" refers to an emulsion, solution, dispersion, suspension, or mixture thereof, which contain emulsified, or dissolved, or suspended in an aqueous medium, particles of at least one film-forming polymer, and optionally, other ingredients or additives which are commonly used in such emulsion, dispersion, or suspension, such as surfactants, foam control agents, biocides, rheology modifiers, etc. The film-forming polymer constitutes a major portion of the solids content of the water based component. Examples of useful emulsions and dispersions as the water based component of the invention include various natural and synthetic film-forming polymers such as polychloroprene, styrene-butadiene rubber (SBR), vinyl-vinylidene chloride, ethylene-vinyl chloride copolymers, vinyl acetate-ethylene copolymers, acrylic polymers, vinyl acetate-acrylic copolymers, polyurethane polymers, and acrylonitrile-butadiene copolymers, with vinyl acetate-acrylic polymers, vinyl acetate-ethylene copolymers and polyurethane polymers being preferred. Latex emulsions are typically supplied in water at a solids content of from about 45 wt % to about 75 wt %, more typically from about 50 wt % to about 65 wt %; whereas the polyurethanes dispersions typically have a slightly lower solids content of from about 35 wt % to about 50 wt %.

The film-forming polymers in the water based component can be identified by a number of means such as particle size, molecular weight, as well as ethylene content in case of the vinyl acetate-ethylene based film-forming polymers. Typically, the particles of the film-forming polymer comprised in an emulsion or a dispersion have an average particle size of less than about 1 micron. For example, polyurethane dispersions normally have an average particle size of from about 0.04 to about 0.08 microns. Vinyl acetate ethylene (VAE) lattices have an average particle size of approximately 1 micron. The number average molecular weight (Mn) is dependent on the type of the film-forming polymer that is used. Typical vinyl acetate ethylene (VAE), vinyl acetate acrylic (VAA) and acrylic emulsions have number average molecular weight from about 500,000 g/mole to about 2,000,000 g/mole whereas a typical polyurethane dispersion has an average number average molecular weight from about 50,000 g/mole to about 150,000 g/mole. Vinyl acetate-ethylene emulsions can also be defined by the ethylene content of the film-forming polymer, which can range from about 10% to about 30%.

Useful commercially available emulsions and dispersions include vinyl acrylic copolymer emulsions PD-2044 and PD-2135 from H. B. Fuller Co. (St. Paul, Minn.), Rovace® HP-2931 and Rovace® HP-3213 from Rohm and Haas Co. (Philadelphia, Pa.); vinyl acetate-ethylene emulsions Airflex® 410, Airflex® 440H, Airflex® 465 and Airflex® 7200 from Air Products and Chemicals (Allentown, Pa.), Elvace 4075-00 and Elvace® 40706-00 from Reichhold Chemical (Research Triangle Park, N.C.); polyurethane dispersions WD-4009 from H. B. Fuller Co., Dispercoll® U53 and Dispercoll(® U42 from Bayer Corp. (Pittsburgh, Pa.); vinyl acetate homopolymers PD-0330 and PD-0382, from H. B. Fuller Co., Rovace® 571 and Rovace® 6206 from Rohm and Haas Co., Vinac® XX-211 and Vinac® XX-241 from Air Products and Chemicals; acrylic copolymers Rhoplex® N-495 and Rhoplex® B-60A from Rohm and Haas Co.

Various water based bookbinding compositions such as those disclosed in U.S. Pat. Nos. 4,536,012; 4,702,496; and 5,443,674, which are incorporated herein by reference, can also be used as the water based component of the invention.

The water based component is present in the adhesive composition in an amount of from about 30 wt % to about 99 wt %, based on the total weight of the adhesive composition. When used as a primer composition, the water based component of the invention preferably comprises from about 70 wt % to about 99 wt %, and more preferably from about 80 wt % to about 99 wt % of the water based component. Alternatively, when used as a one-shot bookbinding adhesive composition, the amount of the water based component preferably ranges from about 30 wt % to about 99 wt %, with about 60 wt % to about 85 wt % being more preferred.

The thermoplastic component is preferably present in a solid particulate form having a relatively large particle size in comparison to the particle size of the film-forming polymer in the water based component. The particles of the thermoplastic component are solid, i.e., they are not porous or vesicular. The particles are large enough that they visibly create topography on the surface of the dried film formed from the adhesive composition. However, the particles are small enough so that they do not hinder the coating application process of the composition. Preferably, the thermoplastic component has a mean particles size of from at least about 10 microns ($\mu$m) to about 1,500 microns ($\mu$m), preferably from about 50 $\mu$m to about 500 $\mu$m.

The thermoplastic component has a softening point temperature of from about 65° C. to about 200° C., preferably from about 65° C. to about 190° C., more preferably from about 65° C. to about 175° C., and most preferably, from about 65° C. to about 120° C., as measured by the Ring and Ball test method. When used as a primer composition, the thermoplastic component is preferably chosen such that its softening temperature is about the same or lower than the application temperature of the second shot hot melt adhesive. It is surmised that the application of the molten second shot hot melt adhesive melts the particles of the thermoplastic component to form a bond between the primer layer and the sequentially applied hot melt adhesive, thereby improving the interfacial adhesion.

The thermoplastic component is relatively fluid at relatively low application temperatures, particularly in comparison to the dried film-forming polymer. The thermoplastic component has a Brookfield viscosity of less than about 100,000 cps, preferably less than about 50,000 cps, more preferably less than about 25,000 cps, and most preferably less than about 10,000 cps at 177° C. The low viscosity allows the thermoplastic component to melt and flow, thus improving the interfacial bond between the primer and the second-shot adhesive in the two-shot method. It also allows the thermoplastic component to flow and form a bond to the substrate in the one-shot method.

Various materials can be used as the thermoplastic component in the adhesive composition of the invention, such as thermoplastic polymers, thermoplastic resins, hot melt adhesives, and mixtures thereof. The thermoplastic polymer may be any polymer that is employed as a base polymer in a hot melt adhesive to provide flexibility, strength, toughness, and adhesion properties. In the embodiments wherein a thermoplastic polymer is employed as the thermoplastic component, the thermoplastic polymer preferably has a melt index ranging from about 1 g/10 min. to about 2,000 g/10 min, preferably, from about 5 g/10 min. to about 1,000 g/10 min, measured according to ASTM D 1238.

Useful thermoplastic polymers include copolymers and terpolymers of ethylene; amorphous polyalphaolefins; homogeneous linear or substantially linear ethylene/α-olefin interpolymers; rubbery block copolymers; polyamides; polyesters; and mixtures thereof.

Preferred copolymers and terpolymers of ethylene include ethylene-vinyl acetate (EVA); ethylene-acrylic acid (EAA) and its ionomers; ethylene-methacrylic acid and its ionomers; ethylene-methyl acrylate (EMA); ethylene-n-butyl acrylate (EnBA); as well as various derivatives thereof, which incorporate two or more comonomers. Copolymers and terpolymers of ethylene generally range in comonomer content from about 15 wt % to about 40 wt %, preferably from about 18 wt % to about 35 wt %, and more preferably from about 18 wt % to about 33 wt %.

Useful commercially available copolymers and terpolymer of ethylene include ethylene homopolymers from Eastman Chemical Co. (Kingsport, Tenn.) under the tradename Epolene®; ethylene-vinyl acetate copolymers from Du Pont de Nemours & Co. (Wilmington, Del.) under the tradename Elvax®; ethylene-vinyl acetate copolymers from Exxon Mobile Chemical Co. under the tradename Escorene®; ethylene-n-butyl acrylate copolymers from Exxon Mobile Chemical Co. (Houston, Tex.) under the tradename Enable®; ethylene-methyl acrylate copolymers from Exxon Mobile Chemical Co. under the tradename Optema®; and ethylene-n-butyl acrylate carbon monoxide terpolymers from Du Pont de Nemours & Co under the tradename Elvaloy®.

Amorphous polyalphaolefins (APAO) are homopolymers, copolymers, and terpolymers of $C_2$—$C_8$ alphaolefins. Useful commercially available amorphous polyalphaolefins include Rextac® and REXFlex® propylene based homopolymers, ethylene-propylene copolymers and butene-propylene copolymers from Rexene (Dallas, Tex.) as well as Vestoplast® alpha-olefin copolymers from Creanova Inc. (Somerset, N.J.). Further, homopolymers, copolymers and terpolymers of propylene are available from Eastman Chemical Co. under the tradename Eastoflex®.

Homogeneous ethylene/α-olefin interpolymers are interpolymers of ethylene and at least one $C_3$—$C_{20}$ α-olefin prepared using a constrained geometry or single site metallocene catalyst. The term "interpolymer" is used herein to indicate a copolymer, or a terpolymer, or a higher order polymer. That is, at least one other comonomer is polymerized with ethylene to make the interpolymer. Preferred homogeneous ethylene/α-olefin interpolymers typically have a low density ranging from about 0.865 g/cm³ to about 0.890 g/cm³, and more preferably less than about 0.880 g/cm³. Useful commercially available homogeneous linear ethylene/α-olefin interpolymers include Exact from Exxon Mobile Chemical Co.; and substantially linear ethylene/α-olefin interpolymers include Affinity® polyolefin plastomers and Engage® polyolefin elastomers from the Dow Chemical Co. (Midland, Mich.)

Useful rubbery block copolymers include A-B-A triblock structures, A-B diblock structures, $(A-B)_n$ radial block copolymer structures, as well as branched and grafted versions of such, wherein the A endblock is a non-elastomeric polymer block, typically comprising polystyrene and/or vinyl, and the B block is an unsaturated conjugated diene or hydrogenated version thereof. In general, the B block is typically isoprene, butadiene, ethylene/butylene (hydrogenated butadiene), ethylene/propylene (hydrogenated isoprene) and mixtures thereof. Commercial available rubbery block copolymers include the Kraton® D and G series block copolymers from Shell Chemical Company (Houston, Tex.), Europrene® Sol T block copolymers from EniChem (Houston, Tex.), Vector® block copolymers from Exxon (Dexco) (Houston, Tex.).

Other useful thermoplastic polymers include thermoplastic polyester polymers such as Hytrel® from Dupont de Nemours & Co., linear saturated polyesters such as Dynapol® and Dynacoll® polymers from Creanova Inc., poly (ethylene oxide) polyether amide and polyester ether block copolymers such as PeBax® polymers from Atofina Chemicals Inc. (Philadelphia, Pa.), and polyamide polymers such as Vestamelt® polymers from Huls America Inc. (Piscataway, N.J.).

The thermoplastic polymer is substantially different from the film-forming polymer present in the water based component. The thermoplastic polymer is not the film-forming polymer in the sense that a dried suspension, emulsion or dispersion containing the particles of the thermoplastic polymer alone would not coalesce to form a film at ambient temperature, but rather would remain as discrete particles regardless of the particle size. The thermoplastic polymers also differ from the film-forming polymers with regard to molecular weight, molecular weight distribution, molten viscosity, and in the case of ethylene based copolymers, with regard to the comonomer content. For example, the thermoplastic polymers normally have a number average molecular weight (Mn) of from approximately 10,000 g/mole to about 250,000 g/mole while the film-forming polymers used in the water based component of the adhesive composition generally have an average number molecular weight of at least 50,000 g/mole up to about 2,000,000 g/mole. As for the comonomer content in ethylene based copolymers, ethylene based copolymers used as film forming polymers comprised in the water based component typically have a comonomer content of no less than about 50 wt %, whereas the ethylene based copolymers employed as the thermoplastic polymer have a lower comonomer content, e.g., no greater than about 40 wt %, and typically ranging from about 15 wt % to about 40 wt %, based on the total weight of the monomer mixture.

The thermoplastic component may also be a thermoplastic resin such as a thermoplastic tackifying resin. The thermoplastic tackifying resins are obtained by the polymerization of petroleum and terpene feedstreams, as well as from the derivatization of wood, gum, and tall oil rosin. These tackifying resins are low molecular weight resins, with the weight average molecular weight (Mw) seldomly exceeding 2,000 g/mole, and often below 1,000 g/mole. Glass transition temperature of the typical tackifying resins is from about 25° C. to about 80° C. Useful thermoplastic tackifying resin(s) include C5 resins, C9 resins and dicyclopentadiene based resins, terpene and styrenated terpene resins, aromatically modified hydrocarbon resins, as well as rosin derived tackifying resins such as rosin esters.

Useful commercially available thermoplastic resins include C5 resins such as the Escorez® 1000 series from Exxon Mobile Chemical Co., C9 resins such as the Kristalex® series of resins from Hercules, Inc. (Wilmington, Del.), dicyclopentadiene based resins such as the Escorez® 5000 series from Exxon Mobile Chemical Co., polyterpene resins such as the Piccolyte® series of resins from Hercules, Inc., terpene phenolic resins such as the Sylvares® TP series of resins from Arizona Chemical (Panama City, Fla.), and rosin ester resins such as Sylvalite® and Sylvatac® rosin esters from Arizona Chemical.

The thermoplastic polymer(s) and thermoplastic resin(s) can be used alone or in combination with each other and/or in combination with other optional ingredients that are commonly used in hot melt adhesives such as plasticizers, waxes, antioxidants, pigments, etc.

The thermoplastic component may also be a hot melt adhesive composition, preferably a hot melt bookbinding adhesive comprising at least one thermoplastic polymer formulated with other thermoplastic ingredients such as tackifying resins and waxes. Additional additives such as antioxidants, pigments, plasticizers, and fillers may also be present in the hot melt adhesive. In the preferred embodiments, one-shot bookbinding adhesives are employed as the thermoplastic component.

The particulate thermoplastic component may be formed in various ways including grinding, spray drying, and so forth. In the preferred embodiments, grinding is accomplished by means of cryogenic grinding (or cryogrinding) using liquid nitrogen. The thermoplastic component are pre-frozen with liquid nitrogen at about −200° C., then ground in a Hammermill grinder that has been also pre-cooled with liquid nitrogen. The resultant ground particles are in a solid, non-uniform fractured form. Spraying, on the other hand, will typically be accomplished at temperatures wherein the thermoplastic component is in a molten form, with subsequent cooling or chilling of the particles. The resultant solid particles will have a more uniform, round shape in comparison with that obtained by grinding. Once obtained, the particles are separated according to the particle size by any known means. Preferably, the particle size of the thermoplastic component is from about 10 µm to about 1,500 µm, more preferably, from about 50 µm to about 500 µm.

The thermoplastic component is present in the adhesive composition of the invention in an amount of from about 1 wt % to about 70 wt %, based on the total weight of the composition. When used as a primer composition, the thermoplastic component is present in an amount of preferably from about 1 wt % to about 30 wt %, and more preferably from about 1 wt % to about 20 wt %. Alternatively, when used as a one-shot bookbinding adhesive composition, the amount of the thermoplastic component preferably ranges from about 1 wt % to about 70 wt %, with about 15 wt % to about 40 wt % being more preferred.

In addition to the water based component and the particulate thermoplastic component, the adhesive composition of the invention may also include ingredients or additives that are commonly used in water based adhesive compositions such as tackifying resin dispersions, plasticizers, rheology modifiers, antifoam agents, surfactants, biocides, pigments, crosslinkers, curing agents, fillers, adhesion promoters, and mixtures thereof.

The adhesive composition may also include starch. Starch may be chosen from any of those that can be mixed with the adhesive composition at a concentration effective to complex a major portion of the free water present during the drying process, while not overly increasing the viscosity of the adhesive composition prior to the drying step. Useful commercially available starch products include potato, wheat, rice, waxy maize, sago, sorghum, arrowroot, tapioca, and mixtures thereof. These raw starch products typically have granules sized within the range of from about 2 to about 150 microns, as measured along the longest axis, and exhibit gel temperatures of from about 55° C. to about 80° C. The starch may be present in an amount of from about 1 wt % to about 20 wt %, preferably from about 2 wt % to about 15 wt % and most preferably from about 3 wt % to about 10 wt %, based on the total weight of the adhesive composition.

The adhesive composition of the invention, i.e., the mixture of the water based component, the particulate thermoplastic component, and optionally, other additives, has a Brookfield viscosity of preferably from about 50 cps to about 50,000 cps at 25° C. In the preferred embodiments wherein the adhesive composition is used as a bookbinding primer composition, the viscosity may range preferably from about 50 cps to about 15,000 cps, more preferably from about 100 cps to about 5,000 cps at 25° C. In the preferred embodiments wherein the adhesive composition is used as a one-shot adhesive composition, the viscosity may range preferably from about 1,000 cps to about 50,000 cps, more preferably from about 2,000 cps to about 20,000 cps at 25° C. The pH of the adhesive composition ranges from about 4 to about 10 and typically depends on the selection of the film-forming polymer contained in the water based component. In the case of styrene-butadiene rubbery (SBR), the composition is relatively basic, whereas other film-forming polymers may form stable emulsions and dispersion in relatively acidic mediums. The solid content of the adhesive composition is preferably from about at least 40 wt % to about 80 wt %, more preferably from about 50 wt % to about 75 wt %.

The adhesive composition of the invention can be prepared by mixing the water based component with the particulate thermoplastic component, and optionally other additives. For example, the particulate thermoplastic component and optionally other additives can be dispersed into the water based component using any known techniques. In the preferred embodiments, an appropriate liquid mixer is charged with the water base component at ambient temperature. The plasticizer, if any, is added and the mixture is kept under stirring for about 0.25 to 0.75 hours. Then additives such as antifoam agent(s) and/or surfactant(s) are added. The mixture is slowly stirred while the particulate thermoplastic component is gradually added. If desired, more additives such as biocides, starch, tackifying resin dispersions, and rheology modifiers are added and thoroughly mixed. Water may be added to adjust the viscosity depending on the end use.

The adhesive composition of the invention is particularly useful either as a one-shot bookbinding adhesive, or as a primer composition in a two-shot bookbinding method in which a hot melt adhesive is sequentially applied as the second-shot adhesive. As a primer composition, the adhesive composition of the invention has utility for potentially any primer application, particularly the applications in which a hot melt adhesive is sequentially applied to the surface of a dry water based primer composition. In the two-shot bookbinding method, the primer composition is first applied to the spine of the book block. The book block is typically made up of signatures, each signature being uniform and containing a specified number of pages. The signatures are collated into a compressed stack or "block." The primer functions as the base or anchor for the second-shot adhesive. The second-shot adhesive is typically a hot melt adhesive composition that is applied molten over the surface of the dried primer. Used as a primer composition, the adhesive composition of the invention, having a low viscosity, exhibits excellent penetration into the book block, thereby providing good side to side bonding between the pages of the book. The adhesive composition of the invention useful as a primer composition also finds utility in instances wherein the second-shot adhesive can be any conventional water based adhesive as well as the adhesive composition of the invention formulated as a second-shot adhesive. In addition, the adhesive composition of the invention also finds utility for the "gluing off" application in which the book blocks are first sewn through the spine.

The adhesive composition of the invention contributes a good page to page adhesion since it is sufficiently fluid such that it is able to penetrate into the paper stock of the book a few millimeters. Upon drying, the water based component coalesces forming a uniform film. The particulate thermoplastic component is not film forming at ambient temperature and once dried, the adhesive composition of the invention exhibits a textured appearance, which is contributed by the particulate thermoplastic component. The thermoplastic component becomes molten or flowable at a relatively low temperature such as around 120° C. in comparison to the film-forming polymer comprised of the water based component and thus, can be heat reactivated at relatively low temperatures.

The adhesive composition of the present invention exhibits several distinct advantages. When used as the primer composition, the water based component comprised in the composition penetrates into the book block, thereby providing good side to side bonding between the pages of the book. Further, the thermoplastic component comprised in the composition melts upon application of the molten second-shot hot melt adhesive and forms a bond with the second-shot hot melt adhesive, thereby improving the adhesive bond at the interface of the water based primer composition and the second-shot hot melt adhesive. The interfacial bonding strength can be improved by at least about 20%, preferably, at least about 30% in comparison to the interfacial bonding strength between the same water based primer composition lacking the thermoplastic component and the second-shot hot melt adhesive. It is surmised that the thermoplastic component functions in such a way that there is better affinity between the thermoplastic component and the second-shot hot melt adhesive than that between the film-forming polymer comprised in the conventional primer composition and the second-shot hot melt adhesive.

The thermoplastic component can be incorporated at relatively high amounts without detrimentally affecting the viscosity. Reducing the water content by increasing the solids content increases the rate of set of the adhesive composition and hence the manufacturing rate overall. The addition of the particulate thermoplastic component also temporarily delays formation of a polymeric barrier during the drying process, thereby resisting the formation of large blisters. Further, the addition of the particulate thermoplastic component results in a dried primer surface that is uniformly textured due to the evenly dispersed thermoplastic component particles. This uniformly textured primer surface enhances the adherence of the second shot adhesive.

When used as one-shot bookbinding adhesive, the adhesive composition of the invention exhibits the combined benefits of a water based adhesive and a hot melt adhesive. The adhesive composition penetrates into the signatures similar to a water based adhesive, yielding good side to side bonding of the pages. Further, upon heating and drying of the adhesive composition, the thermoplastic component becomes molten. The molten thermoplastic component has enough hot tack to pick up a cover or capping paper, which is crucial in the manufacturing process. The ability to pick up a cover or capping paper cannot currently be accomplished with a conventional water based adhesive at production speeds. Another advantage of the adhesive composition over other water based adhesives used as one-shot adhesives is the increased rate of set due to the higher solids content. In addition, the adhesive composition also has the advantages over one-shot hot melt adhesives in that the hot melt pot and premelter are eliminated. The elimination of the premelter and applicator pot equipment is beneficial for safety reasons. Most premelters and applicator pots are heated to temperatures around 177° C. Caution must be used when working with such hot equipment and accidents can happen. By eliminating the equipment, the unpleasant odor and smoke associated with hot melt applicator pots would also be eliminated resulting in a more pleasant work environment.

The adhesive composition of the invention can be applied to the spine of the book block using any standard application method for water based compositions including rolling, brushing, extruding, and so forth.

The following non-limiting examples further illustrate the adhesive compositions of the invention. All parts, ratios, percents and amounts stated herein are by weight unless otherwise specified.

EXAMPLES

Test Procedures
180° Peel Strength Test Method

180° peel strength of the adhesive composition, used as a primer composition, is measured at ambient temperature using a Thwing-Albert Intelect 500 machine as follows:

One side of a 20"×30" piece of canvas is pre-coated with a film-forming polymer such as Airflex® 440H using a paintbrush, dried in an oven at 49° C. for two hours and then, allowed to sit overnight at ambient temperature. A 4"×8" strip is cut from the coated canvas and placed securely with masking tape on a wood block, coated side down. A layer of about 5 mils of the adhesive composition is applied over the uncoated side of the canvas strip using a paintbrush ensuring that all pores are covered. An infrared heat source is then placed at about 6.5 cm distance from the canvas strip for approximately 30–40 seconds in order to dry the samples evenly without yellowing or discoloration.

A hot melt adhesive composition, used as the second-shot adhesive, is immediately poured evenly over the dried adhesive layer at about 177° C. and drawn down with a 20 mil rod. The canvas strip is then immediately covered with a 4"×8" uncoated canvas strip. A 4"×8" wood block with a 1 kg weight is placed over the uncoated side of the canvas strip and allowed to sit until it cools to ambient temperature.

The prepared sample is then allowed to condition at ambient temperature for at least about 24 hours, cut into 2"×8" strips (1" is cut from each edge) and tested in a 180° peel mode at a peel rate of 10 cm/min. The peel is allowed to run for 20 cm and the first 1 cm is not recorded. The average peel strength of a minimum of three samples is reported.

Qualitative Adhesion Test Method

The qualitative adhesion of the adhesive composition, used as a one-shot adhesive composition, is measured at ambient temperature as follows:

A uniform film of the adhesive composition is applied to kraft paper. The film is then dried using an infrared heat source. The infrared heat source is placed approximately 6.5 cm above the kraft paper and radiates heat for about 20 seconds. Coverstock material is immediately applied on top of the adhesive film and a 5 lb rolling pin is rolled over the bond to ensure that a consistent bond is formed. The coverstock material is then slowly pulled away from the kraft paper and the quality of the bond is evaluated by observation. Test specimens are evaluated for fiber tear of the coverstock material and whether the particulate thermoplastic component comprised in the adhesive composition becomes molten.

Drying Speed Test Method I

The drying speed of the adhesive composition is evaluated by visually comparing the drying speed of the test sample to that of the control. Observations are made of the appearance during drying as well as of the appearance of the final dried film. The test sample and the control are prepared by simultaneously applying the adhesive composition to be tested and the control onto a chipboard using a drawdown square to obtain 10 wet mil layer of each. The chipboard is immediately placed under a Research Inc. Model 5610 drying unit having four high density infrared lamps. Power is set at 50%.

Drying Speed Test Method II

The drying speed of the adhesive composition is determined and expressed by weight percent of the dried area as follows:

A 20 mil layer of the adhesive composition is drawn down on chipboard. The sample is placed under an infrared heat source, Research Inc. Model 5610 drying unit, for 20 seconds at 50% power. The chipboard is then removed from the heat source and allowed to cool. The area that has blistered and the total area of the adhesive composition that is drawn down are traced onto transparent film. The traced areas are cut out and weighed, reporting the weight percent of the area due to the blister based on the total weight of the area that is drawn down.

Particle Size And Particle Size Distribution

The particle size and the particle size distribution of the thermoplastic component is measured using a Malvern Mastersize X from Malvern Instrument Ltd. (Malvern, UK).

EXAMPLE 1

HL-3195, an ethylene vinyl acetate copolymer based hot melt adhesive commercially available from H. B. Fuller Co., was cryogenically ground to a mean particle size of about 100 µm using a Hammermill grinder at a temperature of −195° C. 15 wt % of the ground HL-3195 was then added to 85 wt % of Airflex® 440H, a vinyl acetate ethylene emulsion copolymer from Air Products and Chemical Co. (Allentown, Pa.). Example 1 was compared to a control sample containing only Airflex® 440H as Comparative Example A. Both samples were diluted with water until a viscosity of 475 cps at room temperature was achieved. The drying speeds and the appearances of the dried films were evaluated according to the Drying Speed Test Method I. The results are listed in Table I.

TABLE I

| | Relative Drying Speed | Appearance During Drying | Dried Film Characteristics |
|---|---|---|---|
| Com. Ex A | Slower | large blisters | Broken, collapsed large blister, |
| Ex 1 | Faster | Many small bubbles | Uniform small Indentations, coherent |

EXAMPLE 2

20 wt % of ground HL-3195 (about 100 µm) was combined with 80 wt % Airflex® 440H. The viscosity of the mixture was adjusted with water to about 2,000 cps at 25° C. The same Comparative Example A was used as the control, of which the viscosity was also adjusted to 2,000 cps at 25° C. 180° peel strengths were measured according to the 180° Peel Strength Test Method using HL-3195 as the second-shot hot melt adhesive. The results are listed in Table II.

TABLE II

| | Ex 2 | Com Ex A |
|---|---|---|
| 180° Peel Strength (kg) | 8.1 | 4.2 |

EXAMPLES 3–9 AND COMPARATIVE EXAMPLE B

The ground HL-3195 obtained according to Example 1 was added to PD-2044, a vinyl acetate-acrylic polymer emulsion commercially available from H. B. Fuller Co. at regular intervals from 0 wt % to 30 wt %. The viscosity of each composition was adjusted to 2,000 cps at 25° C. with water. 180° peel strengths were measured according to the 180° Peel Strength Test Method using HL-3195 as the second-shot hot melt adhesive. The results are listed in Table III.

TABLE III

| | 180° Peel Strength (kg) | % Increase |
|---|---|---|
| Com Ex B - 0% thermoplastic component | 8.6 | — |
| Ex. 3 - 2.5% thermoplastic component | 12.8 | 49 |
| Ex. 4 - 5% thermoplastic component | 13.7 | 59 |
| Ex. 5 - 10% thermoplastic component | 13.9 | 62 |
| Ex. 6 - 15% thermoplastic component | 18.2 | 111 |
| Ex. 7 - 20% thermoplastic component | 19.2 | 123 |
| Ex. 8 - 25% thermoplastic component | 11.4 | 33 |
| Ex. 9 - 30% thermoplastic component | 12.1 | 41 |

EXAMPLES 10–15 AND COMPARATIVE EXAMPLE B

HL-3204, an ethylene vinyl acetate copolymer based hot melt adhesive commercially available from H. B. Fuller Co was cryogenically ground to a mean particle size of about 100 microns. The ground HL-3204, employed as the thermoplastic component, was added to PD-2044, at amounts ranging from 0 wt % to 30 wt % in increments of 5%. The viscosity of each composition was adjusted to 500 cps at 25° C. with water. 180° peel strengths were measured according to the 180° Peel Strength Test Method using HL-3204 as the second-shot adhesive. The results are listed in Table IV.

TABLE IV

|  | 180° Peel Strength (kg) | % Increase |
|---|---|---|
| Com Ex B - 0% thermoplastic component | 7.0 | — |
| Ex. 10 - 5% thermoplastic component | 8.6 | 23 |
| Ex. 11 - 10% thermoplastic component | 9.2 | 31 |
| Ex. 12 - 15% thermoplastic component | 9.3 | 33 |
| Ex. 13 - 20% thermoplastic component | 10.6 | 51 |
| Ex. 14 - 25% thermoplastic component | 11.2 | 60 |
| Ex. 15 - 30% thermoplastic component | 10.0 | 43 |

EXAMPLES 16–21 AND COMPARATIVE EXAMPLES C AND D

Compositions of Examples 16–21 and Comparative Examples C and D were prepared by combining the ingredients according to Table V.

180° peel strengths and weight percent of the dried areas were measured according to the 180° Peel Strength Test Method and the Drying Speed Test Method II, respectively. The results as well as other physical properties of the compositions are also listed in Table V. Table VI shows the appearances of the dried films evaluated according to the Drying Speed Test Method I.

TABLE V

| RAW MATERIAL | Comp C | Comp D | Ex 16 | Ex 17 | Ex 18 | Ex 19 | Ex 20 | Ex 21 |
|---|---|---|---|---|---|---|---|---|
| AirFlex ® 440H | 93.0 | 79.6 | 80.9 | 79.8 | 70.2 | 44.45 (pH 7) | — | — |
| AirFlex ® 465H | — | — | — | — | — | — | 86.8 | — |
| AirFlex ® 7200H | — | — | — | — | — | — | — | 83.9 |
| WD-4009* | — | — | — | — | — | 44.45 | — | — |
| HL-3195 (<300 μm) | — | — | 10.1 | 5.0 | 8.8 | 11.0 | 10.9 | 10.5 |
| Staley pearl starch** | — | 10.0 | — | 5.0 | 8.8 | — | — | — |
| FOAMASTER VF*** | 0.1 | 0.1 | 0.1 | 0.1 | 0.1 | 0.1 | 0.1 | 0.1 |
| Water | 6.9 | 10.3 | 8.9 | 10.1 | 12.1 | — | 2.2 | 5.5 |
| Solids Content (%) | 51.3 | 53.9 | 54.7 | 54.0 | 56.3 | 51.1 | 65.7 | 71.0 |
| Viscosity (cps, 25° C.) | 1,000 | 1,100 | 1,000 | 1,050 | 1,050 | 500 | 1,050 | 800 |
| Dried Area (%) | 25 | 35 | 32 | 36 | 46 | 59 | 61 | 67 |
| 180° Peel Strength (Kg) | 2.28 | 1.90 | 3.02 | 2.34 | 2.64 | 2.54 | 2.53 | 2.91 |

*polyurethane dispersion from H. B. Fuller Co.
**from A. E. Staley Manufacturing Co. (Decatur, IL)
***antifoam agent from Cognis Co (Ambler, PA)

TABLE VI

|  | Appearance During Drying | Appearance of Dried Film |
|---|---|---|
| Comp C | Large Blisters | Broken, collapsed blisters Areas lifted from clipboard |
| Comp D | Many small bubbles | Uniform surface No breaks in film No lifting from chipboard |
| Ex 16 | Many small bubbles | Uniform surface No breaks in film No lifting from clipboard |
| Ex 17 | Many small bubbles | Uniform surface No breaks in film No lifting from chipboard |

EXAMPLE 22

Adhesive compositions were prepared by combining 70.0 wt % PD-2044S, a vinyl acetate-acrylic polymer emulsion commercially available from H. B. Fuller Co., 1.20 wt % antifoam agent, 0.18 wt % rheology modifier, 0.18 wt % surfactant, 0.05 wt % biocide, 20.77 wt % water and 8.70 wt % ground HL-3195 with particle size distributions as listed in Table VII. The viscosity of each resultant mixture was adjusted to about 1,100 cps at room temperature. 180° peel strengths were measured according to the 180° Peel Strength Test Method, reporting the average value of four samples. The results are listed in Table VII.

TABLE VII

| Particle Size Distribution of Thermoplastic Component (μm) | | | | |
|---|---|---|---|---|
|  | ≦180 | 181–500 | 501–850 | 851–1,400 |
| Peel Strength (Kg) | 6.94 | 5.28 | 3.59 | 4.60* |

*spotty adhesion observed.

EXAMPLE 23

Adhesive compositions were prepared according to Example 22 by combining 70.0 wt % PD-2044S, 1.20 wt % antifoam agent, 0.18 wt % rheology modifier, 0.18 wt % surfactant, 0.05 wt % biocide, 20.77 wt % water and 8.70 wt % ground HL-3096, a styrene-butadiene-styrene (SBS) polymer based adhesive from H. B. Fuller Co, with the same particle size distribution as that in Example 22. 180° peel strengths were measured according to the 180° Peel Strength Test Method using HL-3096 as the second-shot hot melt adhesive. All the samples tested show canvas substrate failure, therefore indicating that the bond is very strong.

EXAMPLE 24

Adhesive compositions were prepared by combining 73.6 wt % PD-2044, 0.06 wt % antifoam agent, 1.84 wt % water and 24.5 wt % ground HL-3195 with particle size distributions as indicated in Table VIII. The viscosity of each resultant mixture was adjusted to about 1,100 cps at room temperature. The quality of the adhesion was evaluated according to the Qualitative Adhesion Test Method, reporting average evaluation of three samples. The results are listed in Table VIII.

TABLE VIII

|  |  | Bonding Strength by Observation |
|---|---|---|
| Particle Size Distribution of Thermoplastic | ≦180 | Strong bond between substrates All bonds produced fiber tear |
|  | 181–500 | Good bond between substrates, |

TABLE VIII-continued

| Component (μm) | | Bonding Strength by Observation |
|---|---|---|
| | 501–850 | Some bonds produced fiber tear<br>Medium amount of hot-melt on both substrates<br>Some voids in bond<br>No fiber tear |
| | 851–1,400 | Hot-melt not completely molten<br>Large voids in bond-many areas where there was no bond to coverstock<br>No fiber tear |

EXAMPLES 25–28

Adhesive compositions were prepared by combining the components listed in Table IX. All the thermoplastic components have a mean particle size of less than about 500 μm. The quality of the adhesion was evaluated according to the Qualitative Adhesion Test Method. All the samples passed the test showing fiber tear.

TABLE IX

| Components | Ex 25 | Ex 26 | Ex 27 | Ex 28 |
|---|---|---|---|---|
| PD-2044S | 73.6 | 73.6 | 73.6 | 73.6 |
| FOAMASTER VF | 0.06 | 0.06 | 0.06 | 0.06 |
| HL-3195 | 24.5 | | | |
| HL-3244* | | 24.5 | | |
| HL-3096 | | | 24.5 | |
| HL-3338** | | | | 24.5 |
| Water | 1.84 | 1.84 | 1.84 | 1.84 |

*ethylene-methyl acrylate copolymer from H. B. Fuller Co.
**ethylene-vinyl acetate copolymer from H. B. Fuller Co.

We claim:

1. An adhesive composition comprising
   a) a water based component comprising a film-forming polymer, and
   b) a thermoplastic component selected from the group consisting of thermoplastic polymers, thermoplastic resins, hot melt adhesive compositions, and mixtures thereof,
   wherein said thermoplastic component is in solid particulate form having a mean particle size of from about 10 microns to about 1,500 microns.

2. The adhesive composition of claim 1, further comprising tackifying resins, plasticizers, surfactants, rheology modifiers, biocides, foam control agents, or the mixtures thereof.

3. The adhesive composition of claim 1, wherein said thermoplastic component has a mean particle size of from about 50 microns to about 500 microns.

4. The adhesive composition of claim 1, further comprising starch.

5. The adhesive composition of claim 1, wherein said composition has a Brookfield viscosity of from about 50 cps to about 50,000 cps at 25° C.

6. The adhesive composition of claim 5, wherein said composition has a Brookfield viscosity of from about 50 cps to about 15,000 cps at 25° C.

7. The adhesive composition of claim 5, wherein said composition has a Brookfield viscosity of from about 2,000 cps to about 20,000 cps at 25° C.

8. The adhesive composition of claim 1, wherein said composition has a solid content of from at least about 40 wt % to about 80 wt %.

9. The adhesive composition of claim 8, wherein said composition has a solid content of from about 50 wt % to about 75 wt %.

10. The adhesive composition of claim 1, wherein said composition exhibits a 180° peel value of at least 20% increase.

11. The adhesive composition of claim 10, wherein said composition exhibits a 180° peel value of at least 30% increase.

12. The adhesive composition of claim 1, wherein said thermoplastic component is present in an amount of from about 1 wt % to about 70 wt %.

13. The adhesive composition of claim 12, wherein said thermoplastic component is present in an amount of from about 1 wt % to about 30 wt %.

14. An adhesive composition comprising
   a) a water based component comprising a film-Forming polymer; and
   b) a thermoplastic component selected from the group consisting of thermoplastic polymers, thermoplastic resins, hot melt adhesive compositions, and mixtures thereof,
   wherein said thermoplastic component is in particulate form having a mean particle size of from about 10 microns to about 1,500 microns and is present in an amount of from about greater than 15 wt % to about 40 wt %.

15. The adhesive composition of claim 1, wherein said thermoplastic component has a softening point ranging from about 65° C. to about 200° C.

16. The adhesive composition of claim 1, wherein said thermoplastic component has a Brookfield viscosity of less than about 100,000 cps at 177° C.

17. The adhesive composition of claim 1, wherein said thermoplastic polymer is selected from the group consisting of copolymers and terpolymers of ethylene, amorphous polyalphaolefins, homogeneous linear and substantially linear ethylene/α-olefin interpolymers, rubbery block copolymers, polyamides, polyesters, and the mixtures thereof.

18. The adhesive composition of claim 1, wherein said thermoplastic component further comprises tackifiers, plasticizers, wax, pigments, antioxidants, or the mixtures thereof.

19. The adhesive composition of claim 1, wherein said thermoplastic component is a hot melt adhesive composition which comprises a thermoplastic polymer, a tackifier, a plasticizers and/or a wax.

20. The adhesive composition of claim 19, wherein said film-forming polymer is selected from the group consisting of vinyl acetate-ethylene copolymers, vinyl acetate-acrylic copolymers, and the mixtures thereof.

21. The adhesive composition of claim 19, wherein said thermoplastic polymer comprises ethylene-vinyl acetate copolymers or styrene-butadiene copolymers.

22. The adhesive composition of claim 1, wherein said film-forming polymer is selected from the group consisting of acrylic polymers, vinyl acetate-acrylic copolymers, vinyl acetate homopolymers, vinyl acetate-ethylene copolymers, polyurethane, and the mixtures thereof.

23. A method of making an adhesive composition comprising
   a) a water based component comprising a film-forming polymer; and
   b) a thermoplastic component selected from the group consisting of thermoplastic polymers, thermoplastic resins, hot melt adhesive compositions, and mixtures thereof, said thermoplastic component being in particulate form having a mean particle size of from about 10 microns to about 1,500 microns, said method comprising
- a) grinding said thermoplastic component to the desired particle size; and
- b) mixing said ground thermoplastic component in particulate form with said water based component.

24. The method of claim 23, wherein said grinding is a cryogenic grinding.

25. A method of binding a book block having a spine area to form a book comprising:
- a) applying the adhesive composition of claim 1 to a book block spine;
- b) drying said adhesive composition; and
- c) applying a second-shot adhesive to the surface of said dried adhesive composition.

26. A method of binding a book block having a spine area to form a book comprising:
- a) applying the adhesive composition of claim 1 to a book block spine;
- b) heating said adhesive composition such that said water based component dries and that said thermoplastic component melts; and
- c) adhering a book cover or a capping paper with said book block through said thermoplastic component.

27. A book produced by the method of claim 25.

28. A book produced by the method of claim 26.

* * * * *